United States Patent [19]

Adachi

[11] Patent Number: 4,517,797
[45] Date of Patent: May 21, 1985

[54] FUEL CONTROL METHOD FOR GAS TURBINE

[75] Inventor: Shigeki Adachi, Hitachi, Japan
[73] Assignee: Hitachi, Ltd., Tokyo, Japan
[21] Appl. No.: 380,774
[22] Filed: May 21, 1982

[30] Foreign Application Priority Data

May 25, 1981 [JP] Japan .................................. 56-78136
Sep. 14, 1981 [JP] Japan ................................ 56-143760
Dec. 4, 1981 [JP] Japan ................................ 56-194544

[51] Int. Cl.³ ............................................. F02C 9/28
[52] U.S. Cl. ................................................. 60/39.281
[58] Field of Search ............................ 60/39.281, 243; 364/431.01, 431.02

[56] References Cited

U.S. PATENT DOCUMENTS

| | | | |
|---|---|---|---|
| 3,520,133 | 7/1970 | Loft et al. | 60/39.14 |
| 3,601,984 | 8/1971 | Davis | 60/39.281 |
| 3,630,023 | 12/1971 | Lazan et al. | 60/39.281 |
| 3,638,422 | 2/1972 | Loft et al. | 60/39.281 |
| 3,639,076 | 2/1972 | Rowen | 60/39.281 |
| 3,662,545 | 5/1972 | Davis | 60/39.281 |
| 4,039,804 | 8/1977 | Reed et al. | 235/151.21 |
| 4,188,781 | 2/1980 | Johnson et al. | 60/39.281 |

Primary Examiner—Louis J. Casaregola
Attorney, Agent, or Firm—Antonelli, Terry & Wands

[57] ABSTRACT

A fuel control method for a gas turbine based on a digital computer. A control system for fuel control, an acceleration control system, an exhaust gas temperature control system, a speed (governor) control system, and a start-up control system are graded in the preference order of fuel control. When a negative feedback signal exceeds a target value in the respective control systems, the fuel control signal is selected in accordance with the grading of the preference order. Of the four control systems, the acceleration and exhaust gas temperature control systems are set to be of the first grade of the preference order and are subjected to an override fuel control preferentially to the other control systems. The acceleration preset value during the acceleration control is determined by values limiting the difference between the speed preset value and the actual speed, the acceleration preset value begins to decrease when the actual speed reaches a value predetermined relative to a target speed, and the acceleration preset value is decreased to zero when the actual speed reaches the target speed, thus performing fuel control.

4 Claims, 17 Drawing Figures

FIG. 5a
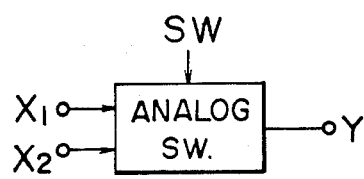
FIG. 5b
| IN PUT | SW | Y |
|---|---|---|
| X₁, X₂ | 0 | X₂ |
|  | 1 | X₁ |
FIG. 5c
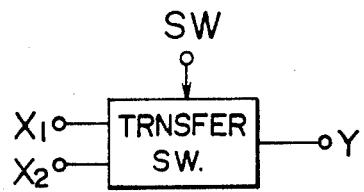
FIG. 5d
| IN PUT | SW | Y |
|---|---|---|
| X₁, X₂ | 0 | X₂ |
|  | 1 | X₂→X₁ (PREDETERMINED CHANGING RATE) |
FIG. 5e
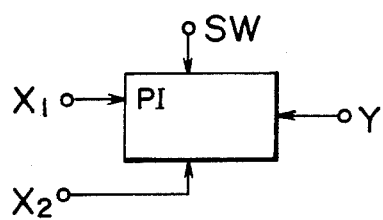
FIG. 5f
| IN PUT | SW | Y |
|---|---|---|
| X₁, X₂ | 0 | INITIAL VALUE X₂, OF INTEGRATOR |
|  | 1 | PI ON THE BASIS OF INITIAL VALUE X₂ |

FUEL CONTROL METHOD FOR GAS TURBINE

This invention relates to gas turbine control and more particularly to a fuel control method for a gas turbine.

Control of fuel flow rate drawn to a combustor is one of the most important controls in controlling a gas turbine generator. The fuel control is effected in relation to start-up, speed, acceleration and exhaust gas temperature control modes. During operation of the gas turbine, selecting or switchover control is carried out which depends on a main control selected from the four control modes.

The present invention makes the most of a digital computer in performing such controls. Especially, operation modules used for the controls incorporate standardized programs adpated for the switchover control between a plurality of control systems.

For example, U.S. Pat. No. 3,520,133 issued July 14, 1970 and U.S. Pat. No. 3,638,422 issued Feb. 1, 1972 respectively disclose a single shaft gas turbine and a two-shaft gas turbine which use a low value gate (LVG) that produces, as a fuel control signal, a lowest-valued signal selected from fuel control signals from the various control systems in order to perform the switchover control between the control modes. U.S. Pat. No. 3,601,984 also discloses the use of a minimum value gate for exhaust gas temperature control.

All of the above U.S. patents transmit the control signals from the various control systems through the low value selection control gate to obtain the fuel flow rate control signal. And, the known systems shown in the U.S. patents are analog control systems and at present, no digital control system is available.

The conventional analog control system employs an operational amplifier as a circuit element and the operational amplifier inevitably faces saturation phenomenon. Particularly, when the operational amplifier is used as a proportional integration element having integration characteristics, it tends to reach a saturated state ultimately as the integration value increases. The saturation value depends on power supply voltage of the operational amplifier. Thus, the output voltage of the operational amplifier approximating its power supply voltage will not increase any more. On the other hand, as emperically known, it takes a long time for the output voltage of the operational amplifier once saturated to recover a normal value i.e., a signal voltage of the so-called operation level. Accordingly, it is necessary to return the saturated level in any of the control systems to the normal signal level before performing the switchover between the control modes, resulting in delay in mode switching.

Especially, the occurrence of the saturation phenomenon of operational amplifier is imminent when the actually measured feedback signal is smaller than the target-value signal and hence the difference therebetween is positive and large. With delay in switching attendant on the acceleration control and exhaust gas temperature control, rapid increase in acceleration and exhaust gas temperature cannot be suppressed.

Such a disadvantage is aggravated in the aforementioned known analog control system using the minimum value gate in the form of a separate unit. In a digital control system, it is possible to employ a signal selecting gate equivalent to the low value gate because the operation elements are standardized to provide the system construction with flexibility.

An object of this invention is to perform gas turbine fuel control by switching the control mode on the basis of a digital computer.

Another object of this invention is to perform fuel control by constituting control systems on the basis of combination of a plurality of programmed operation elements.

Another object of this invention is to provide a switching control method which can be freed from delay in switching in the switchover control of a plurality of control systems.

A feature of this invention is to construct the operation elements on the basis of computer programs and perform fuel control by constituting control systems on the basis of combination of the programmed operation elements.

Another feature of this invention is to grade a plurality of control systems for fuel control in accordance with a predetermined preference order and to control fuel by a particular control system of higher grade of the predetermined preference order when there occur a plurality of control systems in which a negative feedback signal in a feedback control system exceeds a target value.

Another feature of this invention is to constitute the plurality of control systems by an acceleration control system, an exhaust gas temperature control system, a speed (governor) control system and a start-up control system and to select the acceleration control system from the four control systems as the highest grade order control system for fuel control.

Another feature of this invention is to select the acceleration and the exhaust gas temperature control systems from the four control systems as the highest grade order control systems and select one of the two control systems having a negative feedback signal exceeding a target value in a feedback control system, thereby performing fuel control.

Another feature of this invention is to prepare an acceleration instruction signal based on a speed difference signal and control acceleration by an instruction signal which makes the acceleration instruction signal zero when the speed reaches a rated value.

The present invention will be apparent from the following detailed description taken in conjunction with the accompanying drawings, in which:

FIGS. 5a and 5b are diagrams useful to explain an operation element, particularly, an analog switch;

FIGS. 5c and 5d are diagrams useful to explain a transfer switch;

FIGS. 5e and 5f are diagrams useful to explain a PI element;

FIG. 8b is a graph showing characteristics of the control system of FIG. 8a.

Prior to describing preferred embodiments of the present invention, a general description will be given of a fuel flow rate control system for a gas turbine. Major characters used for describing the embodiments are listed in Table 1.

TABLE 1

| | |
|---|---|
| 2TVX | firing signal |
| 28 FDX | firing confirmation signal |
| 2WX | warm-up termination signal |
| ACC | signal produced when the actual acceleration exceeds a preset value |
| ACCL | signal indicative of execution of acceleration control |
| TEMP | signal produced when the exhaust gas temperature exceeds a preset value |
| 26TC | signal indicative of execution of temperature control |
| 14HS | signal produced when the turbine speed is in excess of 90% of a rated value |
| NL | signal indicative of execution of governor control |
| SLT | signal indicative of execution of start-up control |
| MCC | main control signal |
| FDS | fuel demand signal |
| FCS | fuel control signal |
| V | speed signal |
| CFA | acceleration preset value |
| CFN | speed preset value |
| $V_{ACC}$ | acceleration signal |
| $T_E$ | exhaust gas temperature |

Figure 1:
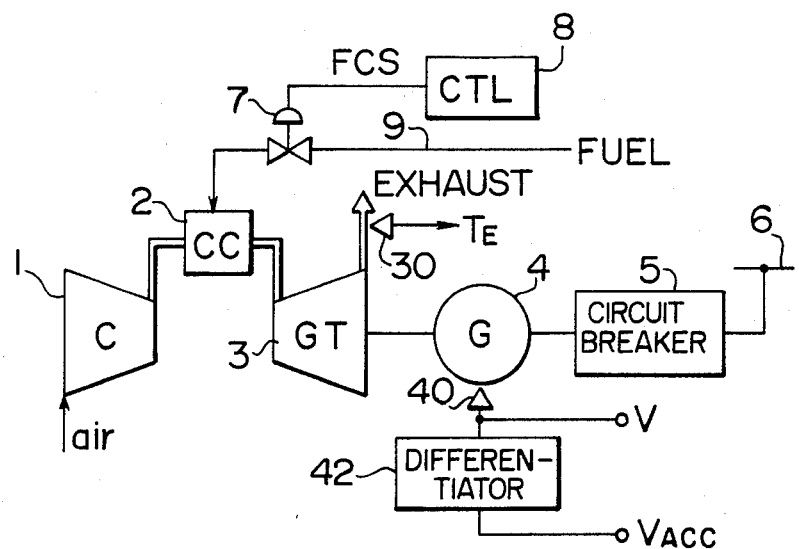
FIG. 1 is an overall schematic diagram of a gas turbine control system.

FIG. 1 illustrates one example of typical arrangements in a gas turbine power plant. Air compressed by a compressor 1 is heated by a combustor 2, turning into a high temperature gas. The gas is supplied to a turbine 3 and it performs work therein, namely, drives a generator 4 to generate electric power which in turn is fed to a transmission system 6 via a circuit breaker 5.

A fuel regulation valve 7 is responsive to an output signal from a fuel controller 8 to control the amount of fuel drawn into the combustor 2.

Figure 2:
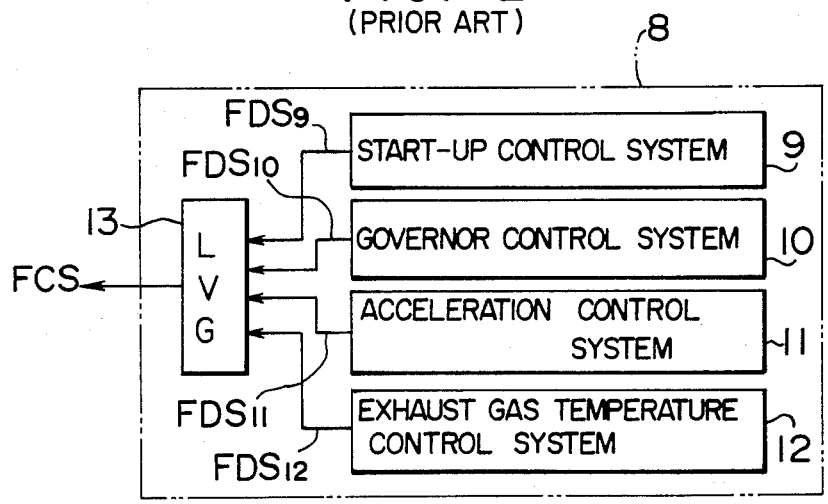
FIG. 2 is a diagram showing an arrangement of control systems in a fuel control system.

FIG. 2 illustrates, in block form, the fuel controller 8. The fuel control system for the gas turbine has main components of a start-up control system 9, a governor control system 10, an acceleration control system 11 and an exhaust gas temperature control system 12. A selector gate 13 selects one of fuel demand signals $FDS_9$, $FDS_{10}$, $FDS_{11}$ and $FDS_{12}$ from the respective component systems 9 to 12 and generates a fuel control signal FCS.

The start-up control system 9 controls, upon start-up of the engine, the fuel flow rate in accordance with a predetermined start-up program to raise the gas turbine speed to a rated value.

The governor control system 10 controls load and speed during normal operation.

The acceleration control system 11 controls the turbine acceleration so as not to exceed a predetermined value upon start-up of the gas turbine.

The exhaust gas temperature control system 12 is adapted to monitor a high temperature section of the turbine so as to prolong the life thereof and it controls the section so that the temperature change rate does not exceed a predetermined value upon start-up and on the other hand the combustion temperature does not exceed a predetermined value during loaded operation.

The selector gate 13 selects optimum one of the four fuel demand signals $FDS_9$ to $FDS_{12}$ in accordance with the operating condition of the turbine and delivers out the selected signal as fuel control signal FCS.

In the conventional control system, a low value gate (LVG) circuit is used as a selector gate 13. The low value gate circuit selects a lowest-valued signal from the fuel demand signals. However, this gate circuit disadvantageously suffers from time delay in switching from the acceleration control to the exhaust gas temperature control or vice-versa.

More particularly, integrators included in the acceleration and exhaust gas temperature control systems become saturated when the amount of feedback is less thn a preset value. Under this condition, if the acceleration, for example, rises abruptly, this abrupt rise cannot be suppressed because switchover to the acceleration control requires an integration time.

The present invention contemplates the provision of a fuel flow rate control method capable of elimianting the above conventional disadvantage.

Figure 3A:
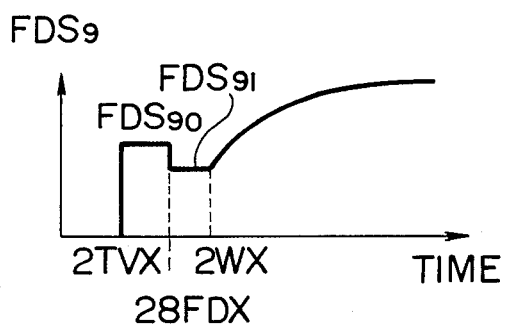
FIG. 3a is a time chart illustrative of a start-up control pattern.

FIG. 3a shows a time chart for explaining the operation of the gas turbine start-up control system. The start-up control system 9 responds to sequential signals to produce the fuel demand signal $FDS_9$ as shown in FIG. 3a.

Specifically, this control system 9 is first responsive to a firing signal 2TVX to produce a demand signal $FDS_{90}$ necessary for firing, then to a firing confirmation signal 28FDX to lower the signal $FDS_{90}$ to a warm-up execution signal $FDS_{91}$ and finally to a warm-up termination signal 2WX to cause the fuel demand signal $FDS_9$ to rise exponentially from the signal $FDS_{91}$.

Figure 3B:
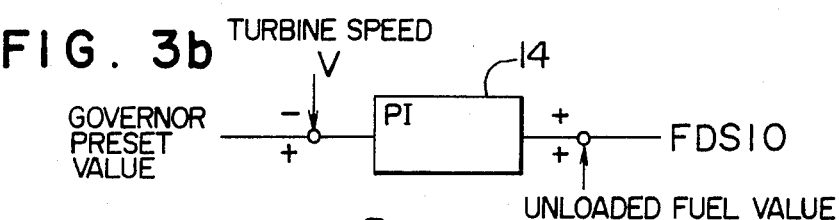
FIG. 3b is a block diagram of a governor control system.

Shown in FIG. 3b is a block diagram of the governor control system 10 which produces the fuel demand signal $FDS_{10}$ that is proportional to a governor preset value.

Specifically, a difference between the governor preset value and a turbine speed is applied to a proportional control 14. Then, a fuel demand output signal of the proportional control 14 is added with a no-load fuel signal to produce the fuel demand signal $FDS_{10}$ for the governor.

Figure 3C:
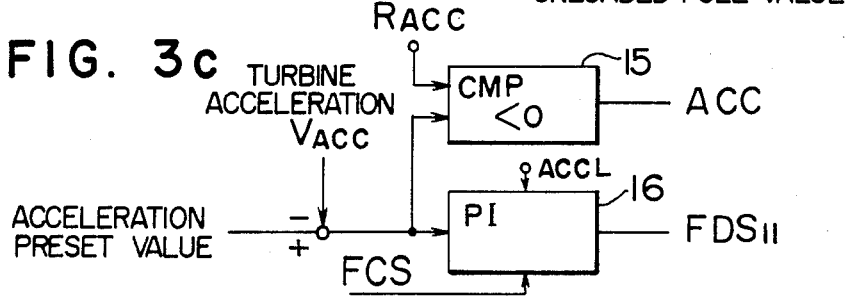
FIG. 3c is a block diagram of an acceleration control system.

Shown in FIG. 3c is a block diagram of the acceleration control system 11 which carries out a proportional-integration control based on comparison between an acceleration preset value and an actual acceleration of the turbine. More particularly, a difference between the acceleration preset value and actual turbine acceleration is applied to a proportional integrator 16 and a proportional integration output therefrom is delivered as the fuel demand signal $FDS_{11}$.

On the other hand, when the actual acceleration exceeds the acceleration preset value, it is detected by a comparator 15 and the comparator 15 produces an output ACC of "1" since a reference signal $R_{ACC}$ is set to zero. Further, when an ACCL signal supplied to the proportional integrator 16 is "0", a fuel control signal FCS currently developing is applied, as an initial value of the integration, to the proportional integrator 16. Then, when the ACCL signal turns to "1", the proportional integrator 16 starts an integration operation with the initial value in terms of the current FCS.

Figure 3D:
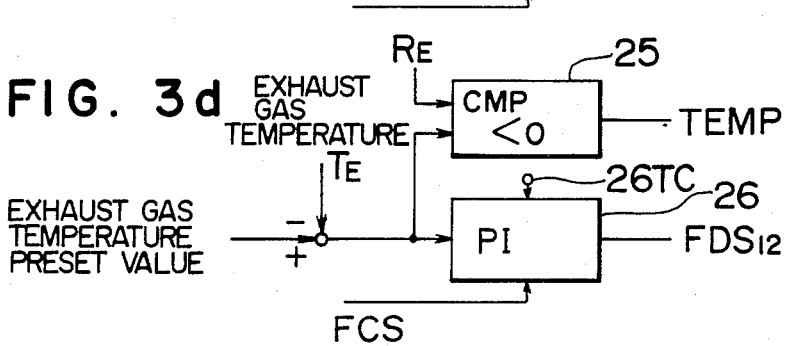
FIG. 3d is a block diagram of an exhaust gas temperature control system.

FIG. 3d illustrates, in block form, the exhaust gas temperature control system 12 in which a temperature value is compared with a turbine exhaust gas temperature to produce a difference which is supplied to a proportional integrator 26 for proportional integration control.

When the turbine exhaust gas temperature exceeds the preset value, a comparator 25 produces an output signal TEMP of "1" since a reference signal $R_E$ is set to zero. Also, when a 26TC signal is "0", a fuel control signal FCS is applied, as an initial value, to the proportional integrator 26.

Figure 4:
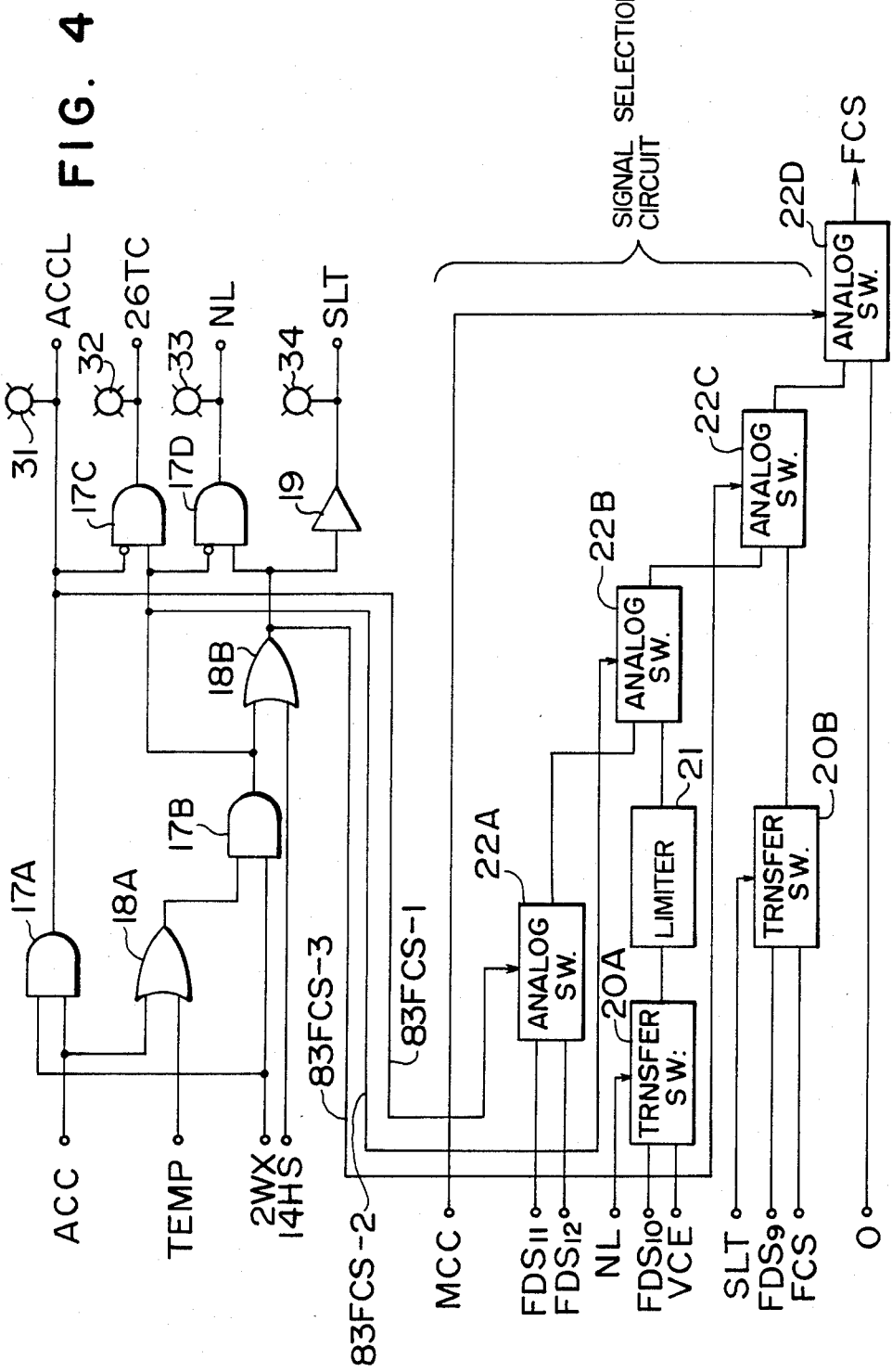
FIG. 4 is a block diagram showing the overall construction of the control system.

FIG. 4 illustrates a preference order decision circuit. The preference order is graded in the order of the acceleration control, the temperature control, the governor control and the start-up control, so that the acceleration control and the temperature control are graded to a higher preference order from the standpoint of protection of an apparatus (gas turbine) body concerned.

In logical operation, since the acceleration control has the highest preference to the remaining controls according to the circuit of FIG. 4 as described above, a signal 83 FCS-1 becomes "1" when the signal ACC becomes "1" following generation of the warm-up termination signal 2WX.

A signal 83 FCS-2 becomes "1" when the warm-up termination signal 2WX and either one of the acceleration control signal ACC or the exhaust gas temperature control signal TEMP are "1".

A signal 83 FCS-3 becomes "1" when the signal 14HS is "1" or when the signal 2WX and either one of the signals ACC or TEMP are "1". The governor control is put into operation when the turbine speed exceeds 90%, that is, when the signal 14 HS is "1".

An ACCL lamp 31 is turned on during the acceleration control. A 26 TC lamp 32 is turned on when the signal 83 FCS-1 is "0" and the signal 83 FCS-2 is "1", thereby indicating the execution of the exhaust gas temperature control.

An NL lamp 33 is turned on when the signal 83 FCS-3 is "1" and the signal 83 FCS-2 is "0", that is, during the governor control. An SLT lamp 34 is turned on in the other case than the above, that is, during the start-up control.

The signals ACCL and 26 TC are used to operate the integrator 16 in the acceleration control system 11 and the integrator 26 in the exhaust gas temperature control system 12, respectively, as described previously.

Illustrated in the lower part of FIG. 4 is a selecting circuit for selection of the fuel control signal. This circuit comprises transfer switches 20A and 20B, a limiter 21, and analog switches 22A to 22D.

The main control signal MCC becomes "1" when the turbine operating conditions are held. When the main control signal MCC is "0", the analog switch 22D produces the fuel control signal FCS of "0".

FIGS. 5a and 5b are illustrative of logical operation for the signal selection by means of the analog switches 22A to 22D and FIGS. 5c and 5d are illustrative of logical operation for the signal selection by means of the transfer switches 20A and 20B. The fuel control signal selection state in each control mode is listed in Table 2.

TABLE 2

|  | Signal 83 FCS-1 | Signal 83 FCS-2 | Signal 83 FCS-3 | Fuel control signal FCS |
|---|---|---|---|---|
| SLT = "1" start-up control | 0 | 0 | 0 | $FDS_9$ |
| NL = "1" governor control | 0 | 0 | 1 | $FDS_{10}$ |
| exhaust gas temperature control | 0 | 1 | 1 | $FDS_{12}$ |
| acceleration control | 1 | 1 | 1 | $FDS_{11}$ |

The mode selection in this embodiment will be exemplified as follows. Assuming that the exhaust gas temperature exceeds the preset value during the start-up control, the signal TEMP in FIG. 3d then becomes "1". In other words, the comparator 25 is set with the reference signal $R_E$ being zero so that when the measured exhaust gas temperature exceeds the exhaust gas temperature preset value and the input signal to the comparator is positive, the output signal TEMP from the comparator becomes "1". In FIG. 4, with TEMP=1, the signals 83 FCS-2 and 83 FCS-3 assume "1". Since the signal 83 FCS-1 is zero, the fuel control demand signal $FDS_{12}$ from the exhaust gas temperature control system 12 is selected as the FCS as will be seen from Table 2 and thereafter the exhaust gas temperature control proceeds.

During the start-up control, the ACCL and 26 TC are both "0" and hence the integrators in the acceleration control system and the exhaust gas temperature control system follow initial values of integration for these integrators which take the form of the fuel control signal FCS.

Therefore, even when the start-up control switches to either the acceleration control or the exhaust gas temperature control, the integrator changes continuously from the current value without imposing any shock on the plant.

Subsequently, when the proportional integration control of the accleration control or exhaust gas temperature control switches to the proportional control by the governor, the fuel control signal changes instantly, resulting in tendency to imposition of shocks on the plant.

Taking the above into account, the transfer switch 20A of FIG. 4 follows up the fuel control signal FCS when NL="0", so that the switchover to the governor control can be carried out gradually on the basis of an initial value in terms of the current fuel control signal FCS.

Figure 6:
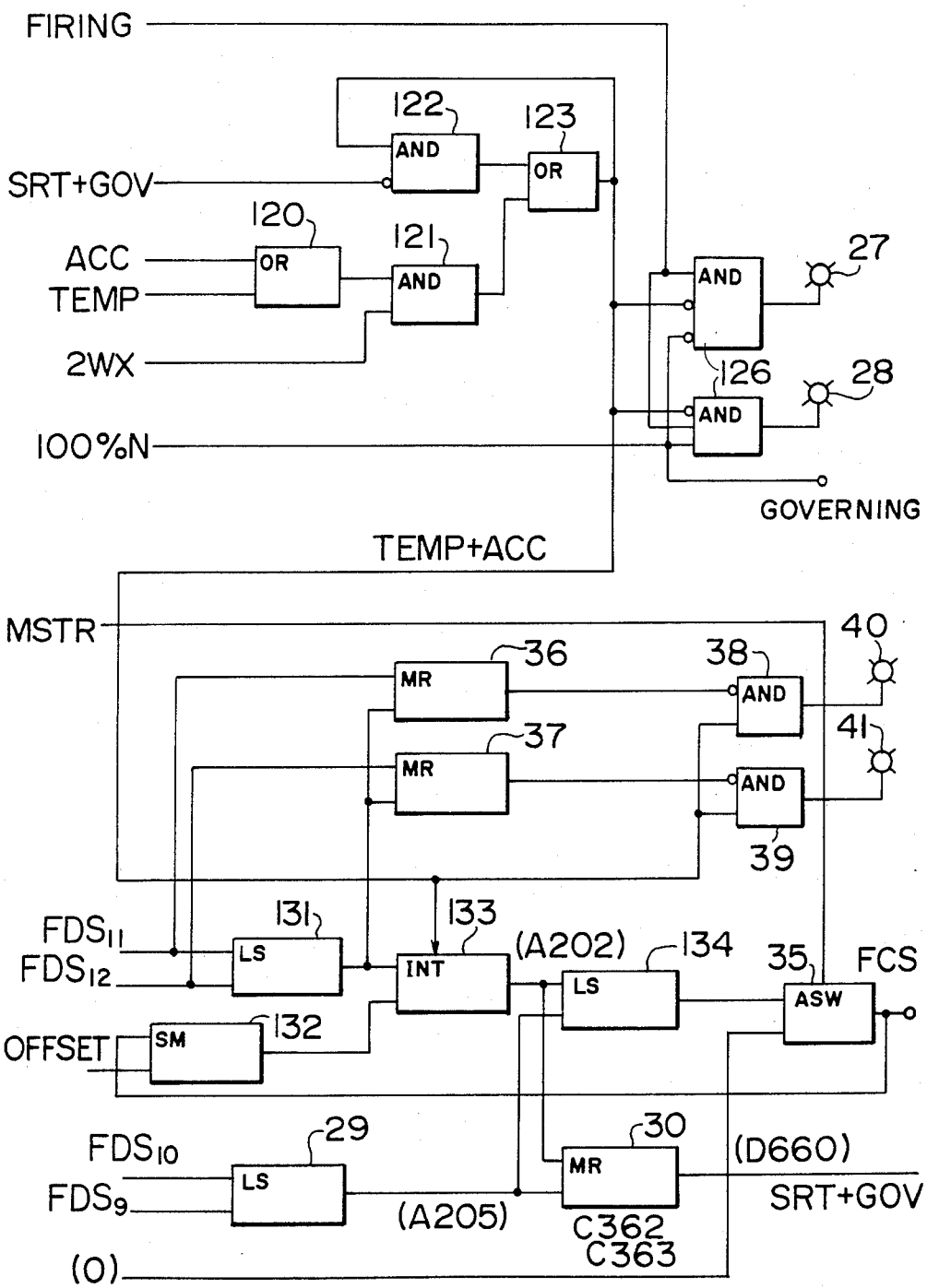
FIG. 6 is a block diagram of an override control system.

Next, even when the acceleration control system and the exhaust gas temperature control system are both set to have the control preference order of the highest grade in the four control systems and the fuel control is now being conducted by another control system, the fuel control is switched to an override control based on the acceleration and exhaust gas temperature control systems if predetermined conditions are satisfied. FIG. 6 shows an example of such a control system.

This override control system is characterized in that the switchover to the override control is carried out by use of the comparators 15 and 25 which detect the polarity of the difference between the preset value and the amount of feedback as shown in FIGS. 3c and 3d.

The start-up program occurs as shown in FIG. 3a. In FIG. 6, when the turbine operating conditions are not held, a master signal MSTR is not produced and an analog switch (ASW) 35 will therefore feed to the fuel regulating valve a fuel control signal FCS in the form of a signal (0) of zero voltage level. So long as the master signal MSTR is not produced, no fuel is supplied to the combustor. With reference to FIGS. 5a and 5b, the analog switch 35 is responsive to a low logical level of a selecting input switch to transmit an input $X_2$ as output Y and a high logical level of the selecting input switch to transmit an input $X_1$ as output Y. The transfer switch operates as will be seen from FIGS. 5c and 5d, and the integrator operates as will be seen from FIGS. 5e and 5f.

Once the turbine operating conditions are held, the turbine is brought into start-up control. During the start-up control, a signal 100% N indicating that the turbine has reached the rated speed will not be produced and basically, a fuel control signal $FDS_9$ from the start-up control system is supplied, as the fuel control signal FCS, to the fuel regulating valve via low selectors 29 and 134 and analog switch 35. When the turbine reaches the rated speed through the start-up control, continuous production of the signal 100% N ensures.

Incidentally, when an override control becomes necessary in process of the above control, information to this effect is stored and held in a flip-flop comprised of an AND gate 22 and an OR gate 23. An amount of feedback in excess of the preset value which occurs in either the acceleration control system or the exhaust gas temperature control system is detected by the comparator 15 or 25. Accordingly, when signal ACC or TEMP purporting an excessive feedback is produced from the comparator 15 or 25 following the production of a warm-up termination signal 2WX, the flip-flop is set by way of an OR gate 120 and an AND gate 21 and the control shifts to the override control. Since a set output signal TEMP+ACC from the flip-flop is applied, as a selecting input, to the low selector 134, a fuel control signal from the override control system is delivered out of the low selector 134. A lowest-valued signal of fuel control signals $FDS_{11}$ and $FDS_{12}$ and from the override control system is supplied, as fuel control signal FCS, to the fuel regulating valve via a low value gate circuit 131, an integrator 133, low selector 134 and analog switch 135, and the input signal to the integrator 133 is controlled by the signal TEMP+ACC.

Tabulated in Table 3 are indications of characteristics of operation modules used in the FIG. 6 system, excepting the analog switches and transfer switches which have already been explained with reference to FIG. 5.

TABLE 3

| Symbol | Operation and its description |
|---|---|
| (A) | $C_1$: upper limit $C_2$: lower limit (Operation) |
| 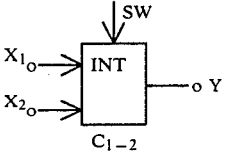<br>(Monitor Relay) | (1) $X_1 - X_2 \geq C_1$ or $X_1 - X_2 \leq C_2$<br> $1 \rightarrow Y$<br>(2) $C_1 > X_1 - X_2 > C_2$  $0 \rightarrow Y$<br>(Description) Y MR $X_1$ $X_2$ C |
| (B) | (Operation) |

TABLE 3-continued

| Symbol | Operation and its description |
|---|---|
| 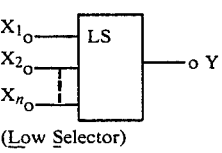<br>(Integrator) | (1) SW = 1, $Y + X_1 \rightarrow Y$<br>$C_2 \leq Y \leq C_1$<br>(2) SW = 0  $X_2 \rightarrow Y$<br>$C_2 \leq X_2 \leq C_1$<br>(Description) Y INT $X_1$ $X_2$ SW C |
| (C)<br>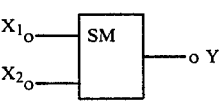<br>(Low Selector) | (Operation)<br>MIN $(X_1, X_2, \text{---} X_n)$<br>(Description)<br>Y LS $X_1, X_2, \text{---} X_n$ |
| (D)<br>$X_{1o} \rightarrow$ SM $\rightarrow$ o Y<br>$X_{2o} \rightarrow$<br>(Sum) | (Operation and Description)<br>$X_1 + X_2 \rightarrow Y$ |

A program module MR, for example, serves to monitor the difference between two signals $X_1$ and $X_2$ and produces an output signal Y of "1" when $X_1 - X_2 \geq C_1$ or $X_1 - X_2 \leq C_2$. When $C_1 > X_1 - X_2 > C_2$, that is, when the difference $X_1 - X_2$ lies between upper and lower limits $C_1$ and $C_2$, the output signal Y is "0".

In actual programming, the program is described as,

Y MR $X_1$ $X_2$ C.

To be more specific, a numerical description is employed. Taking a MR 30, for instance, the numerical description is,

D600 MR A202 A205 C362 C363.

The program description per se is one technique involved in program module preparation, having no direct relation to the invention and will not be detailed herein.

As shown at (B) in Table 3, the integrator 133 integrates a signal equivalent to the sum of the output signal from an adder 132 or fuel control signal FCS and an offset voltage signal OFFSET and operates in a follow-up mode. When the signal TEMP+ACC is obtained under this condition, the integrator 133 will integrate not the output from the adder 132 but the fuel control signal of the override control system from the low value gate circuit 131 on the basis of an initial value equivalent to an integration value currently developing.

While the control is switched to the override control as described above, the override control can conversely be switched to a particular main control by means of the comparator 30. Basically, the comparator 30 generates an initial reset signal (SRT) during the turbine start-up and in addition, it generates a control switching signal (GOV) to reset the flip-flop being in set condition when detecting that the output from the integrator 133 is larger than the fuel control signal of the particular main control system from the low selector 29 and recognizing that the condition for switchover to the main control is satisfied. Namely, the flip-flop is reset by a signal SRT+GOV of the comparator 30. Eventually, the main control or the override control is selected in accorddance with state of the flip-flop.

If the output of the OR gate 120 is intended for selecting the main control or the override control, not only the control switchover will become complicated but also hunting phenomenon will happen to take place. The control switchover according to this embodiment set forth previously can, however, eliminate such inconvenience. Thus, this switchover to the main control system is significant and advantageous in that it assures a smooth switchover without shock attendant on switching. Such significance and advantage obviously owes the principle of comparison of the comparator 30. Also, the switchover between the acceleration control and the exhaust gas temperature control can be done without shock by selecting the speed type proportional integration output by means of the low value gate circuit 131 comprised of a comparator.

In FIG. 6, reference numerals 27, 28, 40 and 41 respectively designate indicators for start-up control, speed/load control, acceleration control and exhaust gas temperature control modes. When an AND gate 125 detects presence of a signal FIRING indicative of actual combustion of fuel in the combustor and absence of the signals TEMP+ACC and GOVERNING, it delivers out a detection output which drives the indicator 27 for start-up control mode. When an AND gate 126 detects presence of the signal GOVERNING and FIRING absence of the signal TEMP+ACC, it drives the indicator 28 for speed/load control mode. When monitor relay 36 or 37 detects that the fuel control signal delivered out of the low value gate circuit 131 is related to the acceleration control or the exhaust gas temperature control, the detection output of the monitor relay 36 or 37 and the signal TEMP+ACC are ANDed by AND gate 38 or 39 to drive the indicator 40 for acceleration control mode or the indicator 41 for exhaust gas temperature control mode.

As described above, the present invention employs the speed type proportional integration operation element used in the override control system, whereby switching of the main control to the override control is carried out at the time the demand for the switchover is detected, and switching of the override control to the main control is carried out at the time the fuel control signal concerning the override control becomes larger than that concerning the main control. The invention is therefore advantageous in that immediate switchover to the override control can be accomplished at the time either turbine acceleration or exhaust gas temperature representative of the amount of feedback exceeds the preset value, in contrast to the conventional apparatus.

Figure 7:
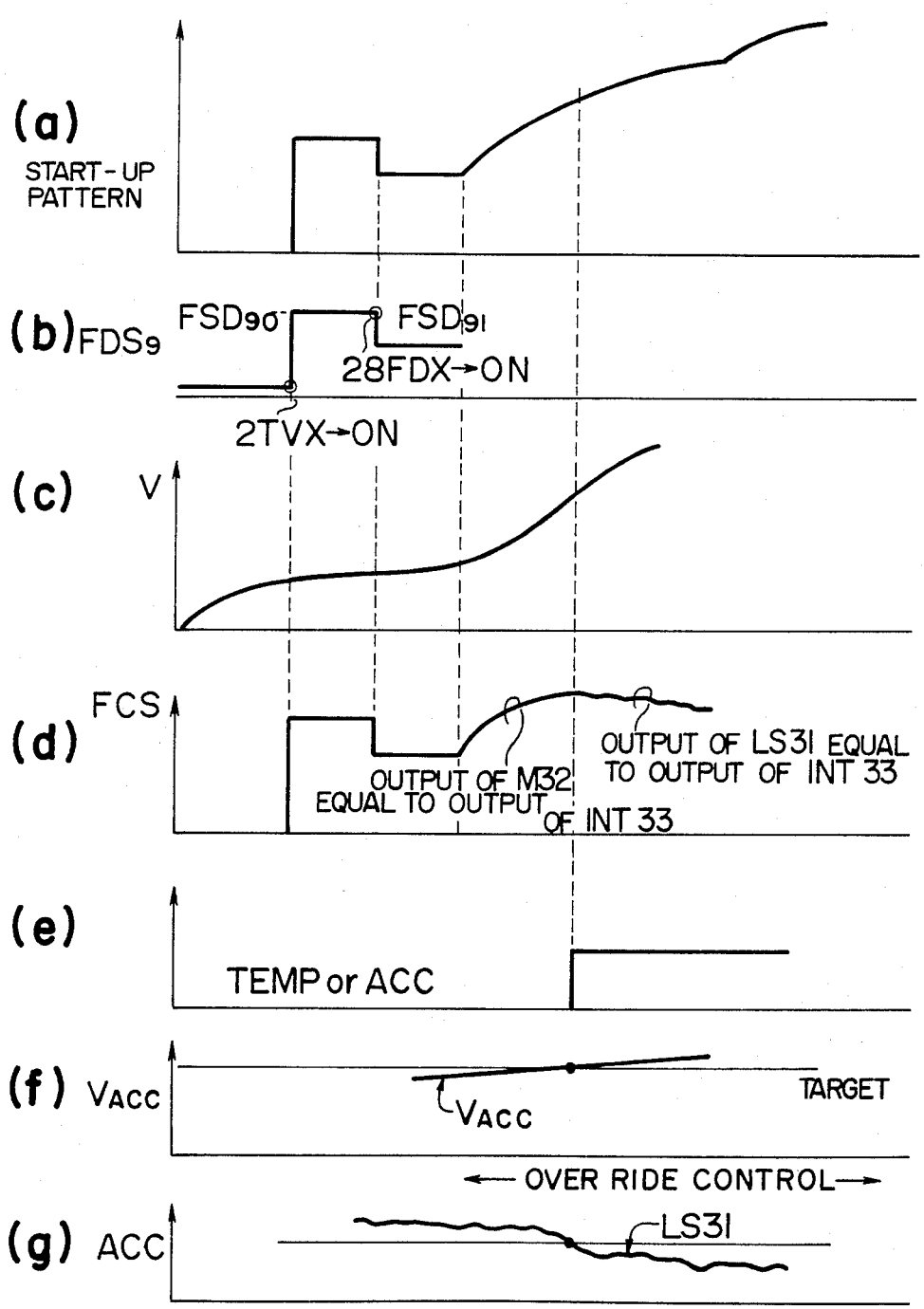
FIG. 7 illustrates in sections (a) through (g) signal waveforms occurring when the main control switches to the override control by an acceleration in excess of a preset value during start-up operation based on a given start-up pattern.

FIG. 7 illustrates in sections (a) through (g) the above operating conditions in which the acceleration control particularly switches to the override control by detecting the actual acceleration in excess of the preset value in the course of execution of the start-up pattern.

Figure 8A:
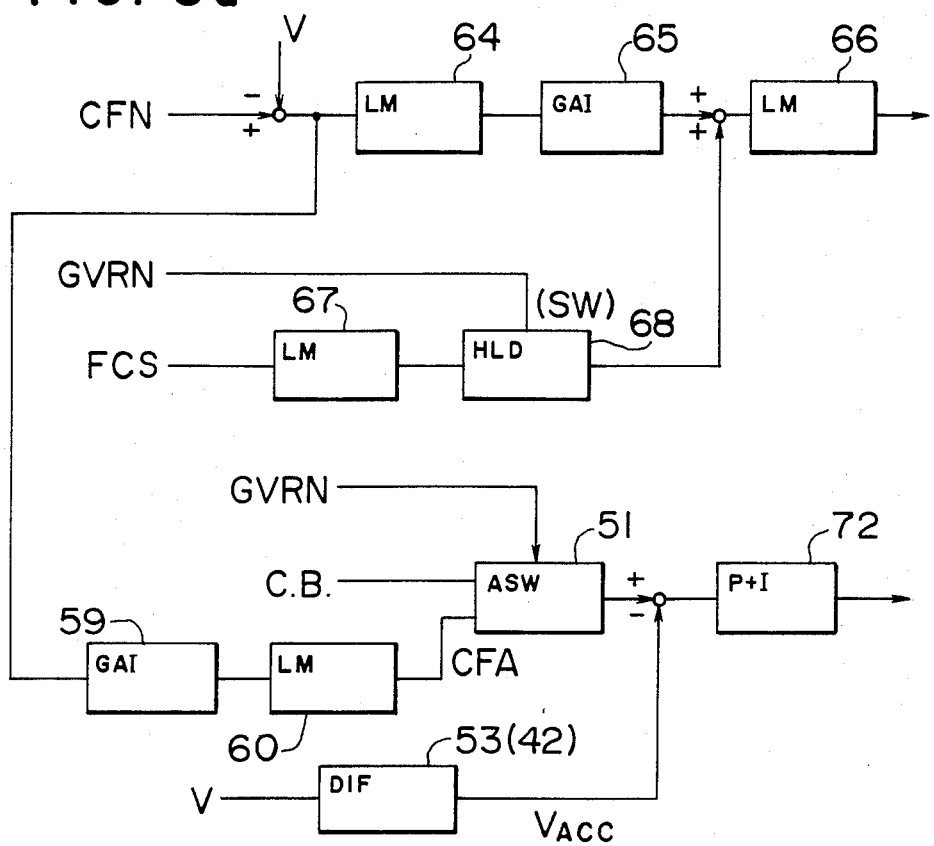
FIG. 8a is a block diagram of a control system which is freed from overshooting during acceleration control.

The acceleration control is switched to the speed control without overshooting when the turbine speed reaches the rated speed following the start-up control as will be described below. A feature of this control is such that the preset value of acceleration approaches to zero as the turbine speed approaches the rated value, and the fuel control signals of the acceleration control and speed/load control systems are made equal to each other upon switching of the acceleration control to the speed/load control. FIG. 8a shows a system construction for implementing this control.

In the acceleration control system, an acceleration preset value in the form of an output from an analog switch 51 is compared with a differential of turbine speed derived from a differentiator 53, and a difference is subjected to proportional integration and delivered to a selector gate.

In the speed/load control system, a speed preset value CFN is compared with an actual speed V, and a difference is subjected to proportional operation at a gain setting unit 65 and delivered to a selector gate.

The preset value in the acceleration control system is so selected as to be proportional to the speed difference by means of the analog switch 51 prior to switchover to the speed/load control mode, namely, when a signal GVRN is zero.

More particularly, the acceleration preset value CFA is expressed as, $$CFA = [K \times (CFN - v)]_a^b$$

where
CFN: speed preset value which is equal to the rated speed before a generator breaker is energized;
V: actual turbine speed;
K: coefficient by gain setting unit 59; and
[]b: limiting values by limiter 60 with a being upper limit and a being lower limit.

Figure 8B:
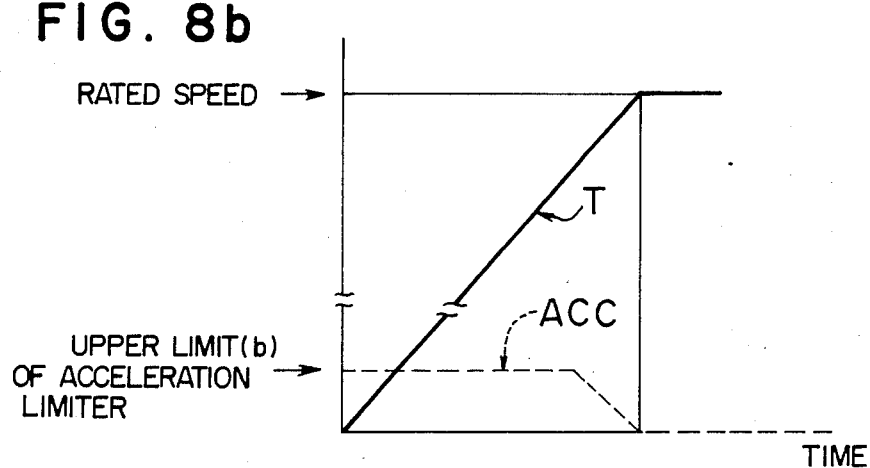

With the control system of FIG. 8a, the acceleration preset value can be varied as shown in FIG. 8b. Specifically, since the signal V is zero and the CFN corresponds to the rated speed during the start-up, K(CFN−v) assumes a large value which is limited by the upper limit b of the limiter. This large value is identified as an acceleration preset value during the start-up. When K(CFN−V)<b is held following gradual increase of the speed, the acceleration preset value begins to decrease.

For example, for b being 1%/sec. and K being ⅓, deceleration starts at 97% of the rated speed.

The acceleration preset value decreases with increase of the speed until it falls to zero at CFN=V, that is, when the speed reaches the rated value.

When the rated speed is reached, a signal GVRN becomes "1" and the acceleration preset value is determined by a selecting bias value CB. The selecting bias is a very large value so that the output from the acceleration control system becomes large and the selecting gate selects the speed/load control.

A full speed unloading bias employed in the speed/load control system to assure the supply of fuel during rated speed running must have a value which is equal to the output of the acceleration control system developing when the rated speed is reached under the acceleration control.

Change of the control mode causes the speed to change.

To prevent the change of speed upon the mode switching, a hold circuit 68 is provided for the speed/load control system. When the signal GVRN becomes "1" and switchover to the speed/load control is accomplished, the hold circuit produces an output corresponding to a currently developing output OFF of the selecting gate. At this time, CFN=V stands and the output of the speed/load control system becomes FCS, thereby accomplshing a bumpless mode switching.

In FIG. 8a, reference numerals 64, 66 and 67 designates limiters, and 72 a proportional integrator.

The hold circuit 68 is a program module the output of which is equal to the input when the signal SW is "0" and remains unchanged when the signal SW is "1".

The limiters LM 66, 67, 60 and 64 are signal limiter program modules. A differentiator DIF 53 is equivalent to a differentiator 42 as shown in FIG. 1.

As described above, this embodiment can advantageously prevent overshooting when the engine speed reaches the rated value following the acceleration control and the change of speed when the acceleration control switches to the speed control.

I claim:

1. A fuel control method for a gas turbine wherein a plurality of control systems for fuel flow rate control are graded in accordance with a predetermined preference order, a fuel flow rate control signal of a particular control system of the highest grade in the predetermined preference order is selected when an actually measured value in the form of a feedback signal exceeds a target value in the plurality of control systems, and the fuel flow rate is controlled by the selected signal, the plurality of control systems comprising start-up, speed, acceleration and exhaust gas temperature control systems, the acceleration control system and the exhaust gas temperature control system being both of the first grade of the preference order, and controlled preferentially to the other control systems.

2. A fuel control method for a gas turbine according to claim 1 wherein when the negative feedback signal exceeds the target value in both the acceleration and exhaust gas temperature control systems, a fuel control signal of one control system having a larger absolute value of difference between the negative feedback signal and target value than the other is selected, and fuel is controlled by the selected signal.

3. A fuel control method for a gas turbine wherein a plurality of control systems are provided for fuel flow rate control, said control systems being graded in accordance with a predetermined preference order, a fuel flow rate control signal of a highest grade control system being selected among said plurality of control systems when each control system provides an actually measured value in the form of a feedback signal exceeding a target value, and the fuel flow rate being controlled by the selected fuel flow rate control signal, the plurality of control systems comprising start-up, speed, acceleration and exhaust gas temperature control systems, the acceleration control system and the exhaust gas temperature control system being both of the first grade of the preference order, and controlled preferentially to the other lower grade control systems.

4. A fuel control method for a gas turbine according to claim 3 wherein when the negative feedback signal exceeds the target value in both the acceleration and exhaust gas temperature control systems, a fuel control signal of one control system having a larger absolute value of difference between the negative feedback signal and target value than the other is selected, and fuel is controlled by the selected signal.

* * * * *